United States Patent
Schmitt

(10) Patent No.: US 7,913,259 B2
(45) Date of Patent: Mar. 22, 2011

(54) TASK-GRAPH FOR PROCESS SYNCHRONIZATION AND CONTROL

(75) Inventor: Gunter Schmitt, Eppingen (DE)

(73) Assignee: SAP AG, Walldorf (DE)

( * ) Notice: Subject to any disclaimer, the term of this patent is extended or adjusted under 35 U.S.C. 154(b) by 1391 days.

(21) Appl. No.: 11/393,945

(22) Filed: Mar. 31, 2006

(65) Prior Publication Data

US 2007/0234367 A1    Oct. 4, 2007

(51) Int. Cl.
  *G06F 9/46* (2006.01)
  *G06F 9/44* (2006.01)
(52) U.S. Cl. ............ 718/102; 718/100; 717/124
(58) Field of Classification Search ........ 718/100, 718/102, 104; 717/124; 714/25
  See application file for complete search history.

(56) References Cited

U.S. PATENT DOCUMENTS

| | | | | |
|---|---|---|---|---|
| 5,202,987 A | * | 4/1993 | Bayer et al. | 718/102 |
| 5,530,861 A | * | 6/1996 | Diamant et al. | 705/8 |
| 7,296,188 B2 | * | 11/2007 | Paternostro et al. | 714/38 |
| 7,539,992 B2 | * | 5/2009 | Takemura | 718/102 |
| 7,721,289 B2 | * | 5/2010 | Remany et al. | 718/104 |
| 2003/0097650 A1 | * | 5/2003 | Bahrs et al. | 717/124 |
| 2005/0114839 A1 | * | 5/2005 | Blumenthal et al. | 717/124 |

FOREIGN PATENT DOCUMENTS

KR    2005077395 A    *    8/2005

* cited by examiner

*Primary Examiner* — Kenneth Tang
(74) *Attorney, Agent, or Firm* — Mintz, Levin, Cohn, Ferris, Glovsky & Popeo, P.C.

(57) ABSTRACT

Systems and methods are disclosed for testing applications or code. In one exemplary embodiment, there is provided a method for testing an application on one or more different hosts on a processor using a task graph including a parent task and one or more child tasks. The task graph can also contain a single, parent task without child tasks. The method may include, for example, providing the parent task to initiate the task graph at the processor, the parent task including a task number unique to the task graph; providing the one or more child tasks, the child tasks each including a task number unique to the task graph and a command to be performed by the one or more child tasks; and enabling, at the processor, the parent task to initiate execution of the application at the processor. Moreover, the method may include processing user defined input values to define each task.

17 Claims, 4 Drawing Sheets

US 7,913,259 B2

TASK-GRAPH FOR PROCESS SYNCHRONIZATION AND CONTROL

DESCRIPTION OF THE INVENTION

1. Field of the Invention

The present invention generally relates to building and testing software applications. More particularly, the present invention relates to providing a task graph having a plurality of tasks associated with the task graph for testing one or more software applications.

2. Background of the Invention

In large software development environments, there is a need to centrally build (e.g. compile and link) source code automatically and to test software automatically. This is done to ensure that the source code can be compiled into executable machine code and that software functions properly (e.g. when the software is developed and/or when updates to the software are made). Testing applications may involve dozens, if not millions, of test tasks. These tasks can include, for example, compiling software, running the compiled code, providing test data as an input to the compiled code for execution, receiving an output from the code when it executes, running other tasks to analyze that output, and identifying when the execution results in a failure. In addition, some of these tasks depend on the outcome of a previous task. Clearly, testing of software (or code) is extremely complex. Moreover, developers of code frequently test their code. For example, code may be tested on a periodic basis, such as at the end of the business day. In this example, the tasks of a test may be run overnight and then analyzed the next day.

There is thus a need to provide a tool to facilitate the testing of code by managing the tasks associated with a test and managing the outcome of the tasks.

SUMMARY

The present invention provides method and apparatus, including computer program products, for providing tasks that test applications or code.

In one exemplary embodiment, there is provided a method for testing an application on a processor using a task graph including a parent task and one or more child tasks. The method may include, for example, providing the parent task to initiate the task graph at the processor, the parent task including a task number unique to the task graph; providing the one or more child tasks, the child tasks each including a task number unique to the task graph and a command to be performed by the one or more child tasks; and enabling, at the processor, the parent task to initiate execution of the application at the processor.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of implementations consistent with the present invention and, together with the description, help explain some of the principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
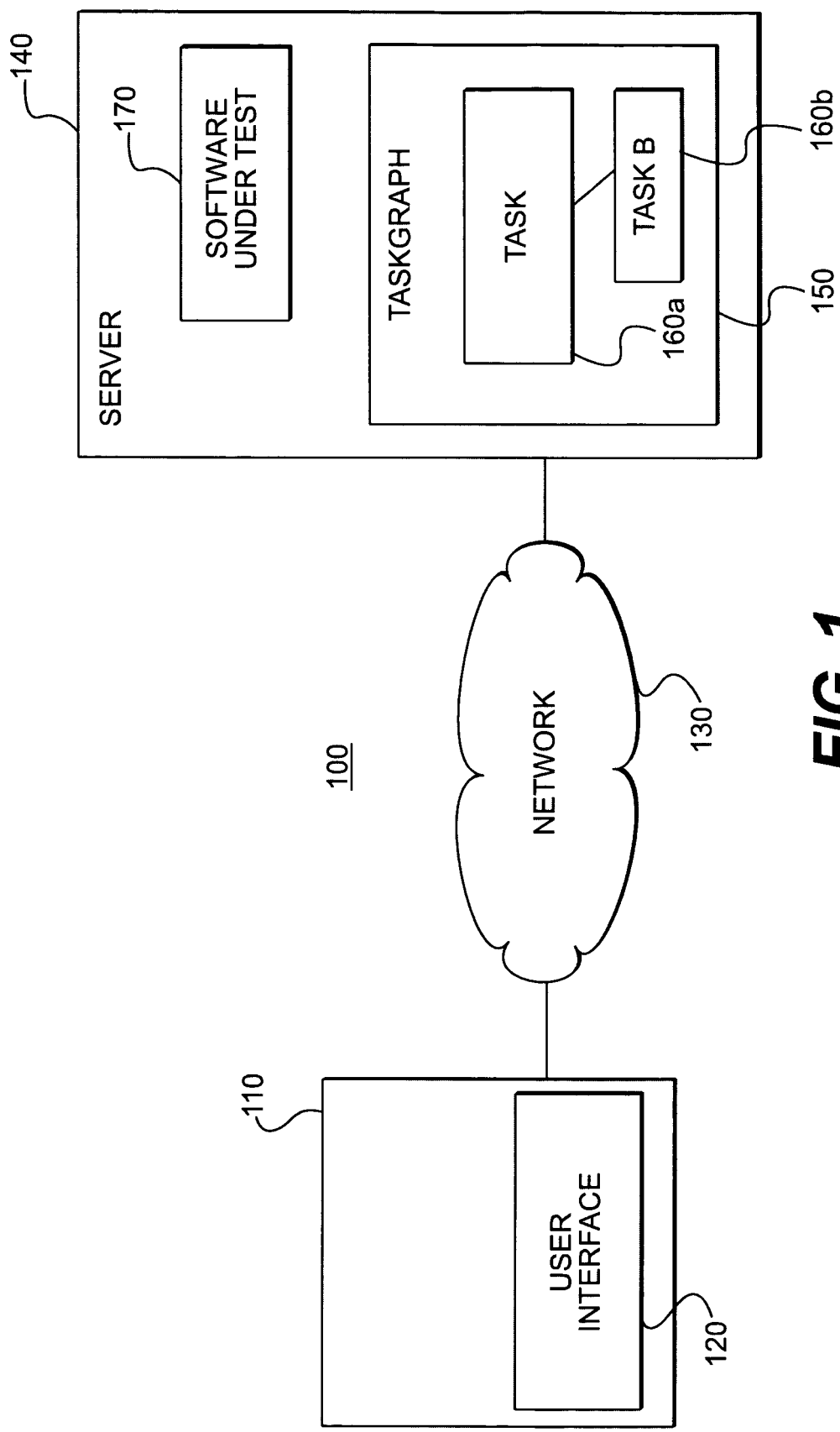
FIG. 1 illustrates a block diagram of an exemplary system environment consistent with certain aspects related to the present invention.

FIG. 1 illustrates a block diagram of an exemplary system environment 100 consistent with certain aspects related to the present invention. Referring to FIG. 1, system 100 includes a client system 110 connected to a server system 140 by a network 130. The client system includes a user interface 120, and the server system 140 includes a task graph 150 that includes tasks 160a-b. Although the description of system 100 is made in the context of a client-server environment, any other environment can be used instead.

The client system 110 may include one or more processors, such as a computer, to interface with server system 140. User interface 120 may provide an interface to allow a user to interact with other applications, such as allowing the user to instantiate applications on server system 140. User interface 120 may be implemented as a graphical user interface for using task graph 150. For example, a Web browser may be used as user interface 120. As used herein, the term "instantiate" means, in an object oriented programming environment, an object of a particular class, and, more generally, includes deploying, customizing, running and/or executing an application.

A computer suitable for use as a client or a server includes, among other things, a processor for executing instructions and one or more memory devices for storing computer program instructions and data. The computer may also receive data from and/or transfer data to one or more mass storage devices for storing data, e.g., magnetic, magneto optical disks, or optical disks. Furthermore, the computer may be capable of interfacing to a network, such as network 130.

Network 130 may include, alone or in any suitable combination, a telephony-based network, a local area network (LAN), a wide area network (WAN), a dedicated intranet, a wireless LAN, the Internet, a wireless network, a bus, or any other any communication mechanisms. Further, any suitable combination of wired and/or wireless components and systems may be used to provide a communication mechanism. Moreover, network 130 may be embodied using bidirectional or unidirectional communication links. Further, network 130 may utilize protocols such as Transmission Control Protocol/Internet Protocol (TCP/IP), Hyper Text Transfer Protocol (HTTP), SOAP (Simple Object Access Protocol), and Remote Procedure Call (RPC).

Server 140 may include one or more processors, such as computers. The server 140 may include a task graph 150. Task graph 150 is implemented as an application which can be called to test software ("software under test") 170. Task graph 150 contains one or more tasks, such as tasks 160a-b. The tasks 160a-b are combined in a graph structure and the execution of each task is achieved according to the structure of the graph in parallel or serial, depending on the graph structure. A task thus performs a function or task associated with testing the software under test 170. A task may have a link (or reference) to a preceding task (also referred to as a "predecessor" or "parent" task) and to subsequent tasks (also referred to as "successor" or "child" tasks.) The execution of a task depends on the outcome, such as the success or failure, of a preceding task. A "return code" may be used to indicate whether a task successfully executed. The return code is used to indicate the success or failure of a program to the calling program when the program ends with an integer number. The success is indicated by a return code of "0", and the failure is indicated by a different return code (e.g., "1"). For example, a task may compile code associated with software under test 170. If that task completes, it returns a code of "0," and if it fails it returns a code of not "0", such as the value "1" (or any other value other than "0"). As such, task graph 150 facilitates the testing of software, such as software under test 170.

Although software under test 170 is depicted at server 140, software under test 170 may be located at any other computer accessible by a network connection. Moreover, although FIG. 1 depicts only a single instance of software under test 170, a plurality of software may be tested as well. Examples of software that may be tested are database software, Web services software, and components thereof.

Figure 2:
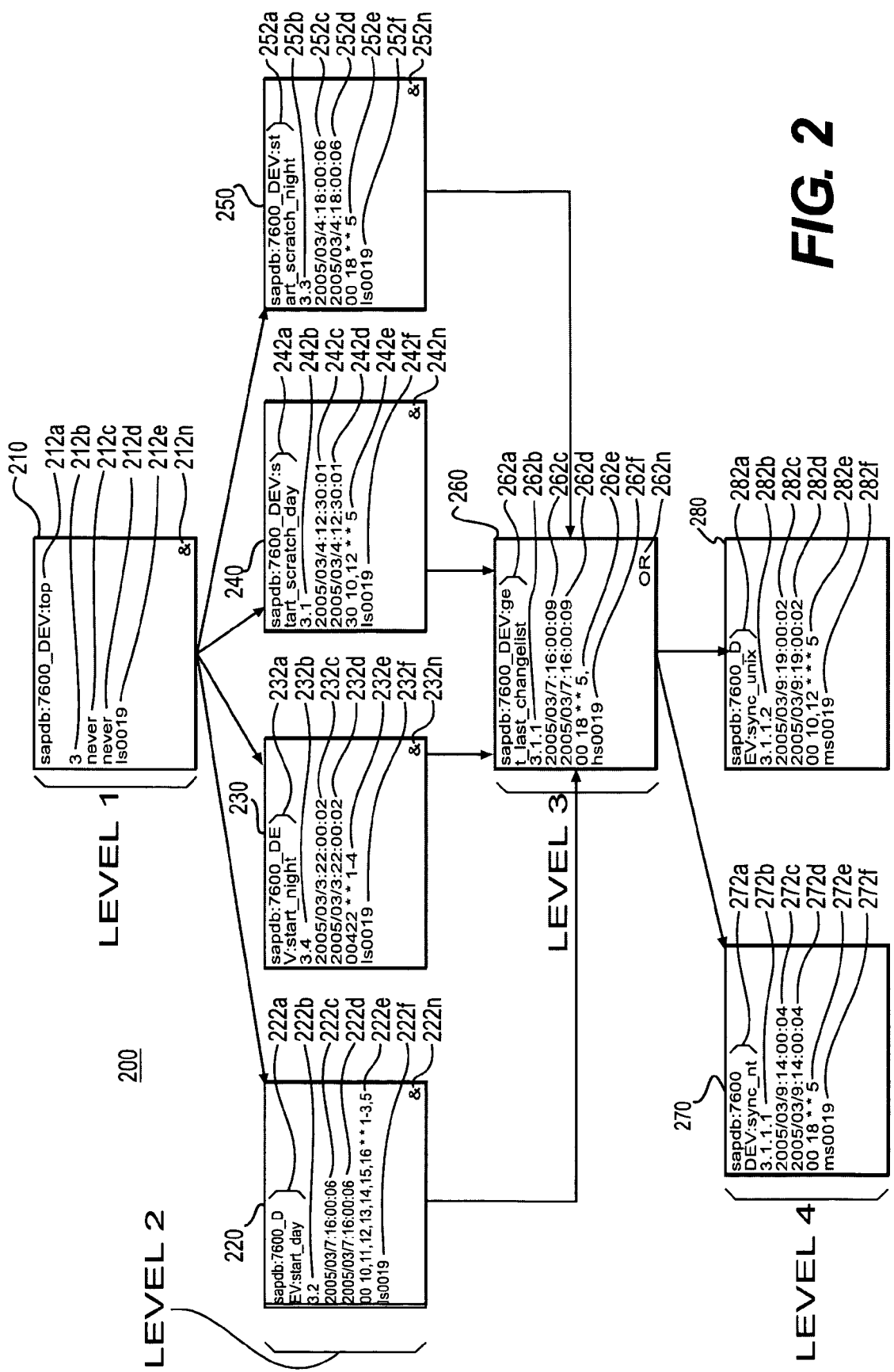
FIG. 2 depicts another block diagram of an exemplary system for displaying a task graph containing tasks contained within the task graph consistent with certain aspects related to the present invention.

FIG. 2 illustrates a block diagram of a task graph 200 consistent with certain aspects of the present invention. Task graph 200 contains tasks 210-280. The start of task graph 200 may be initiated by task 210 (also referred to as a "head" or "parent" task). Head task 210 may contain the name of the task 212a. The name may be any identifier that the user chooses to associate with the operation of a particular task. The task 210 includes a unique, hierarchical task number 212b. Further description of the unique, hierarchical task number 212b is provided below. The task 210 also includes the time at which the task was last started 212c and was last stopped 212d. This last start and last stop time, 212c and 212d, refer to the last time the task was performed, if executed by server 140. If the difference in time between the last start time 212c and the last stop time 212d is less than one second, the task started and stopped on the same day. In task 210, the last start and last stop time are "never." Therefore, task 210 does not actually perform a command associated with software under test 170. Rather, task 210 serves to initiate or signal the successor tasks, such as tasks 220-250, to begin execution at a predetermined execution time. Finally, task 210 includes a host identifier (id) 212e, such as an identifier of the server 140 performing the task.

Task graph 200 also includes a group of successor tasks 220-280. Tasks 220-280 are also referred to as "child" tasks. Each of the successor tasks 220-280 contain the name of the task 222a, 232a, 242a, 252a, 262a, 272a, 282a, a unique, hierarchical task number 222b, 232b, 242b, 252b, 262b, 272b, 282b, a last start time 222c, 232c, 242c, 252c, 262c, 272c, 282c, a last stop time 222d, 232d, 242d, 252d 262d, 272d, 282d, a scheduled execution time 222e, 232e, 242e, 252e, 262e, 272e, 282e, and a host id 222f, 232f, 242f, 252f, 262f, 272f, 282f. The scheduled execution time, 222e, 232e, 242e, 252e, 262e, 272e, 282e, is when the task will be performed, i.e. executed by the server hosting the task. The scheduled execution time, 222e, 232e, 242e, 252e, 262e, 272e, 282e, is a value in "crontab" format, a time format used in Unix, that is entered by the user, and defines when the task is automatically executed. For example, task 220 depicts an execution time of 00 10, 11, 12, 13, 14, 15, 16 * * 1-3, 5. The "00" refers to the minute at which the task automatically executes, the "10, 11, 12, 13, 14, 15, 16" refer to the hours that the task automatically executes, the "* *" refers to the month and day of the month that the task automatically executes, and the "1-3, 5" refers to the day of the week that the task automatically executes. Therefore, task 220 will automatically execute at hours 10, 11, 12, 13, 14, 15, and 16 (i.e. 10 am.-4 pm.), at every day of every month, and the $1^{st}$-$3^{rd}$ and $5^{th}$ days of the week (i.e. Monday through Wednesday and Friday). Tasks that include a scheduled execution time, such as time 222e, are referred to as "scheduled tasks."

Each task may be associated with predecessor tasks and successor tasks. Therefore, head task 210 is associated with successors 220-250 and tasks 220-250 are associated with predecessor 210. Each task may contain a return code, which may be assigned a value of "0" or not "0" (e.g., "1"). If a task is run successfully (e.g. compile without error), a return code of "0" will be output from the task to its successor tasks. Conversely, if the task is not run successfully (e.g. syntax error in source code or "compiler error"), a return code of not "0" will be output from the task to the successor tasks. These return codes can be combined, such as a logic-based combination of "AND" logic and "OR" logic. For example, FIG. 2 shows logic symbols at some of the tasks, including logic symbols 212n, 222n, 232n, 242n, 252n, 262n.

For example, tasks 220-250 receive return codes from task 210 and logically combine the return codes by AND logic. Therefore, if tasks 220-250 receive a return code value not "0" (e.g., "1") from task 210, they will not execute. If tasks 220-250 receive a return code value of "0" from task 210, tasks 220-250 will execute.

In FIG. 2, task 260 receives return code values from tasks 220-250, and combines the return code values by an OR logic 262n. Because task 260 implements an OR logic 262n, as long as at least one of the return code values output from tasks 220-250 is a "0," which indicates that a task ran successfully, task 260 will execute. On the other hand, task 260 will not execute if every return code value from tasks 220-250 is a not "0" (e.g., "1").

The taskgraph 200 contains numerous levels. Level 1 begins with head task 210, and each successive group of one or more tasks comprises an additional layer. Furthermore, each level is included in the unique, hierarchical task number that is associated with each task. For example, task 220 appears in level 2, and the unique, hierarchical task number 222b associated with task 220 is 3.2. With each additional level, the unique, hierarchical task number includes an additional period and number. For example, the unique, hierarchical task number 262b of task 260, which appears in level 3 is 3.1.1. Similarly, unique, hierarchical task numbers 272b and 282b of tasks 270 and 280 are 3.1.1.1 and 3.1.1.2, respectively, because tasks 270 and 280 appear in level 4. Regardless of how many tasks occur in a level, or how many levels are present, each task may have a task number that is unique to that task and to the server. This unique, hierarchical task number may enable the user to quickly locate a desired task within the task graph.

Though not shown in FIG. 2, tasks may also contain a no operation (NOP) command that is used for task graph definition purposes. Any task in the task graph may contain a NOP command. For example, if a NOP command was implemented on the head task 210, the task will not execute. Instead, task 210 would provide an indication to the successor tasks that they should begin execution at the predetermined time (e.g. start time).

Figure 3:
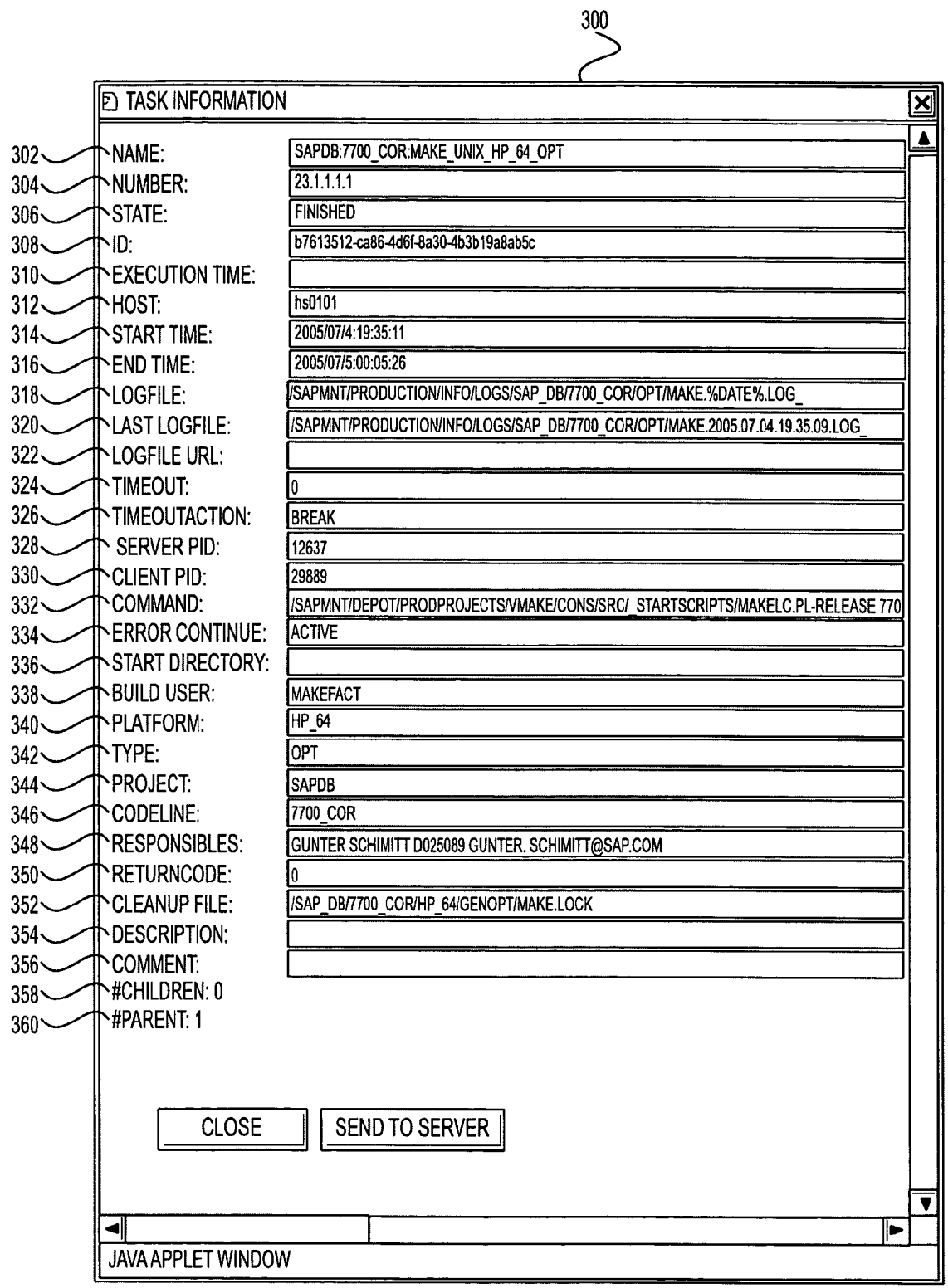
FIG. 3 depicts a user interface where task properties can be viewed and changed in a popup menu consistent with certain aspects related to the present invention.

FIG. 3 depicts a user interface 300 where a task and properties defining the task can be defined, viewed, and modified using a graphical user interface, such as a Java Applet window, although other graphical user interfaces may be used as well. The user can provide information at graphical user interface 300 that is associated with each of the tasks 210-280 in the task graph 200.

The user can view the name of the task 302 and the unique, hierarchical task number 304 associated with the task, but these values cannot be modified at runtime because the name has a impact to the hierachical structure of the task graph, and the number is given to the task by the server (i.e. when the task-graph is loaded on the server).

The user may also view a state 306 (e.g. WAITING, RUNNING, FINISHED, ERROR). The state 306 is set automatically by the server, which controls task graph execution. All tasks get the state "WAITING" when the task graph is loaded on the server and no explicit states are defined. A task may be started as a single task, it may be started by invoking one or more successor tasks, and it may be started by importing predecessor export values and/or successors. When tasks execute, they get the state "RUNNING," and when they are finished they get a state depending on the return code. If the return code is "0" they get the state "FINISHED." If the return code is not "0" (e.g., "1") they get the state "ERROR".

The user may also provide an ID 308 that is associated with the task. The ID 308 is set at run time, but it is a dynamic value. Therefore, this ID will change once the tasks executes. The ID will change every time the task executes, and the new ID that is associated with the task will be generated at random. Specific tasks can run multiple times, therefore leading to multiple, random ID values that are associated with the task. These multiple, random ID values can be stored and allow the user to identify the history of execution corresponding to each specific task. Providing numerous ID values allows the users to effectively access each execution performed by each task.

The user can view the last start time 314 and the last stop time 316, which are both set automatically when the task starts execution and finishes execution. The user can input the execution time 310, and the host id 312. The user may also provide the logfile 318, which is the complete logfile path, as well as the last logfile 320 and the logfile URL 322, if it is applicable to a task. The logfile (including the logfile path) is the file where the output of the executed command is written. The user can input a "time out" 324 in seconds and a "time out action" 326, which is the action that occurs after the timeout. Examples of the time out action include BREAK, KILL_BREAK, CONTINUE, and KILL_CONTINUE. The user can view a server-pid 328 and a client-pid 330, which will change when the task executes. The server-pid 328 and the client-pid 330 are integer numbers which will be set automatically by the operating system when a task is executed. There is one initial process on server side (i.e. server-pid 328) and one parent process on client side (i.e. client-pid 330). This value can be used to identify the process of the running task on the remote host.

The user can also determine and input a command 332 that the task will operate during the timeframe (between the start time and end time). This command value is executed at the server hosting the application under test 170. Command values can be anything that can be executed, such as sending email or showing the contents of a directory. Examples of other commands include scripts to start synchronization of source-code files, scripts to start compilation of source-code, scripts to copy build-results. The user can also input an error continue value 334 that is predetermined at design time, a start directory value 336 which directs a task to change to a desired user input directory before executing any command at the client system 110, and a build user value 338, which is the user directory under which the command is executed on the client.

Further, the user can input a platform value 340 which indicates which platform the task is running, a type value 342 which is source code that was compiled for debugging the program or compiled to optimize performance of software, a project value 344 which is an information setting that corresponds to a source file for a "make" process, a codeline 346 which is a software release, such as a development release or a consolidated release, responsibilities 348 which identify who is responsible for a task and that person's corresponding information, and a return code 350 of the specific task which defines the initial return code of the task. The user can input a cleanup file 352 that contains a path to a filename that the user determines. If the user wishes to stop, or kill, a task that is currently running, the user can save desired files from this task in the filename that the user designates as the cleanup file. The user can input a description 354 and comment 356 so that the user and others who view the task information can quickly determine attributes of the task. Finally, the user can indicate the number of successor tasks 358 and the number of head tasks 360 that are associated with the task.

In addition to the task properties shown in FIG. 3, a task may include other properties. For example, the graphical user interface 300 may also allow the user to define a schedule which defines the tasks execution time in crontab format. The execution time can be in minutes, hours, days, months, and day of the month and can be changed. The user interface 300 can include a "task list name" that is used to identify a task that cannot be changed. The "task list name" is the name for one task graph (i.e. 150) on the server. There are usually more than one "task list name", and, in the user interface, the task graph can be selected by using the "task list name". The user interface 300 can also include a "depends_on" value which identifies tasks from which the specific task depends on. For example, a "depends_on" value links task 220 to task 260, forming the structure of the task graph, shown in FIG. 2 as link 265. A task may also include a user value that may define the name of the user under which the process runs on the remote host, and an export value that can be changed and defines variable names and optional values for another task. An example of an export value, named "SCRATCH", may remove the directory-content before a command is executed. The user interface 300 can also include a loadable value. If this value is set, the value is usually "yes", and the value is used to mark tasks which can be loaded (i.e. as a head task of a task graph) onto the server. The user interface 300 can also include a "runninglock" value that locks that task so the task will not start while another task in the task graph is currently running, and a logic value, such as AND or OR, corresponding to the logical combination of the predecessor-tasks.

As stated above, tasks receive and combine, by a logical combination, the return code values from each of the predecessor tasks. In addition, the task can also receive export values from the predecessor tasks by an import-export mechanism. The import-export mechanism can be a static export or a dynamic export. Static export values can be set during the task list definition and these values cannot be overwritten by dynamic export values.

For example, when a task completes testing, such as the testing of an application program, service, or portions thereof, the task may generate a file that contains the results obtained from testing. This file is a dynamic export value because it is not set when the properties of a task, such as task 200, is defined, as described above with FIG. 3. Rather, the file is determined once a task executes. The return code value is also a dynamic export value because it shows the success or failure of the latest run of the task command on the server system 140. Therefore, both the return code value associated with the task and the file that contains the results obtained from testing will not overwrite values defined during the task list definition.

FIG. 2 is a graphical depiction of the operation of numerous tasks in a task graph. The properties defining a task provided by, for example, a user's input, in FIG. 3, command execution of each task, which are stored in a database as XML (EXtensible Markup Language) code. When the client 110 connects to the server 140 through the network 130, the server 140 reads the XML code that stores the values for each task, as depicted in lines 1-25 of Table 1.

TABLE 1

Example of XML code

| | |
|---|---|
| 1 | <tasklist> |
| 2 |   <headtask> |
| 3 |     <taskname>top</taskname> |
| 4 |     <tasklistname>test1</tasklistname> |
| 5 |     <command>NOP</command> |
| 6 |     <executiontime>00 18 ***</executiontime> |
| 7 |     <successor>t1</successor> |
| 8 |     <successor>t2</successor> |
| 9 |   </headtask> |
| 10 |   <task> |
| 11 |     <taskname>t1 </taskname> |
| 12 |     <command>false</command> |
| 13 |     <host>hs0113</host> |
| 14 |     <successor>t3#!0</sucessor> |
| 15 |   </task> |
| 16 |   <task> |
| 17 |     <taskname>t2</taskname> |
| 18 |     <command>dir</command> |
| 19 |     <host>pwdfm120</host> |
| 20 |     <export> |
| 21 |       <varname>TESTVAL </varname> |
| 22 |       <content>123</content> |
| 23 |     </export> |
| 24 |     <successor>t3</successor> |
| 25 |   </task> |

Referring to Table 1, lines 2-9 define a head task, such as task 210 The name of the task ("taskname") is "op" (line 3), the "tasklistname," which identifies a task graph when loading a new task on the server 140, is "test 1." The command performed by the task is "NOP," therefore the task represented by lines 2-9 gives a signal for successor tasks (e.g. tasks 220-250) to initiate execution of other tasks. The signal is given at hour 18, which is 6 pm., and the signal is output to tasks t1 and t2.

Lines 10-15 define task "t1." The name of the task is t1 (line 11) and the command is false, representing a UNIX command, which returns a return code of not "0" e.g., "1"). The host name associated with task t1 is "hs0113," and the return code is output to, and executed at, successor task t3 as long as the return code is not "0", as defined by "#!0" in line 14. If the return code is not defined, the default dependency will return to a return code "0". [The task t3, though not shown in Table 1, will execute, because "t1" has a return code of not "0" (e.g., "1") after execution because of the false command.]

Lines 16-25 define task "t2." The name of the task is t2 (line 17) and the command is "dir," which directs the task to show the contents of a directory. Line 19 contains the host ID associated with task t2, and task t2 exports, to a "export variable" no file named TESTVAL (line 21), the content "123" (line 22). These export values are set by the user in advance; therefore, these values will be static export values As such, they will always output to successor task t3 and will not be overwritten by dynamic export values.

Figure 4:
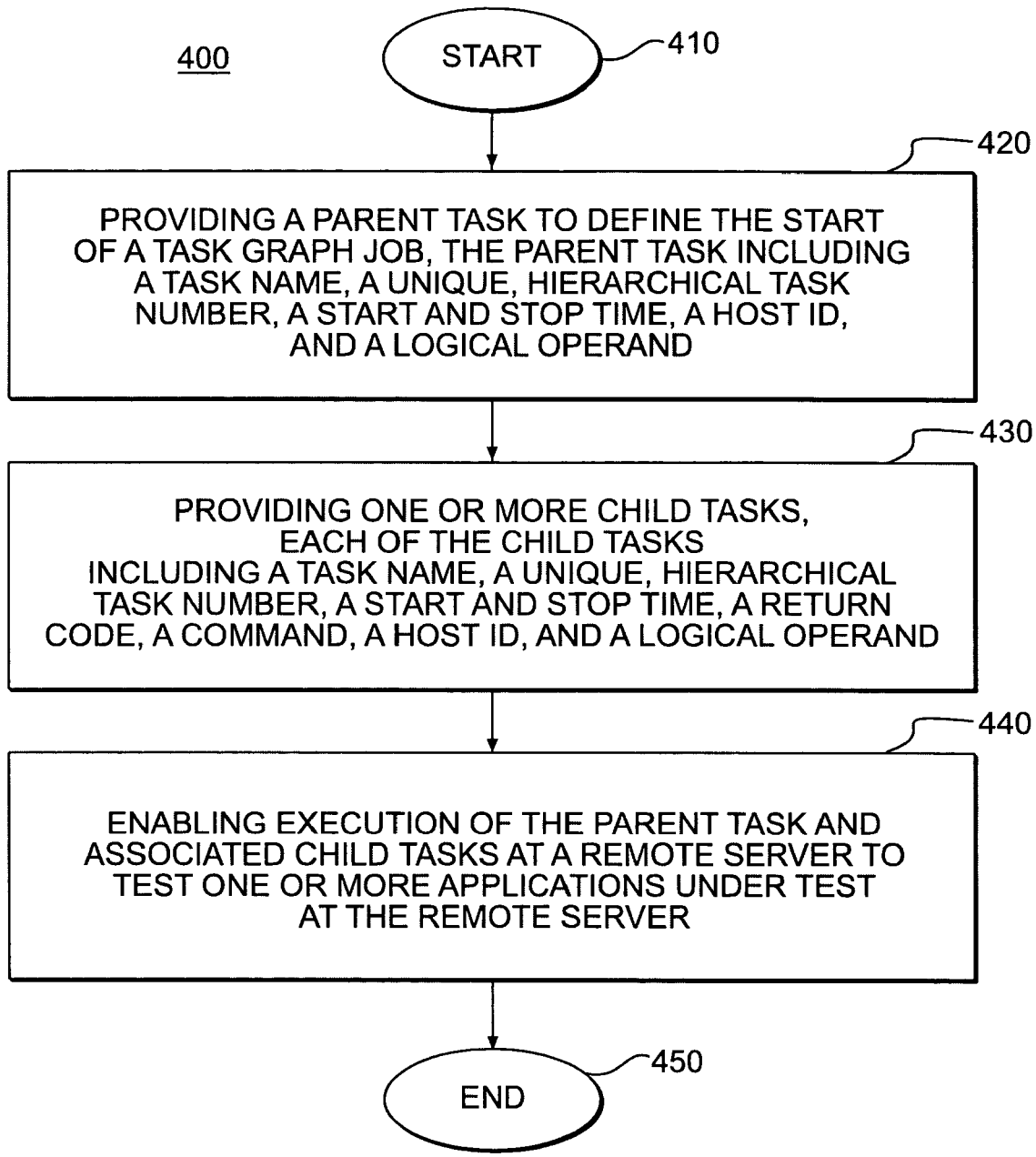
FIG. 4 depicts a flowchart with steps for operating a task graph consistent with certain aspects related to the present invention.

FIG. 4 is a flowchart 400 for implementing a task graph, such as task graph 200, from a computer, such as the client system 110, consistent with aspects of an embodiment of the present invention. Once the user inputs task properties associated with each task of the task graph, the operation will start at step 410. Once the operation starts, a parent task, such as task 210, defines the start of the task graph 200 job in step 420. This parent task includes values associated with the properties for the task, including, for example, a task name (e.g. 212*a*), a unique, hierarchical task number (e.g. 212*b*), a last start time (e.g. 212*c*), a last stop time (e.g. 212*d*), a host ID (e.g. 212*e*), and a logical operand (e.g. 212*n*).

Once the parent task is provided in step 420, one or more successor tasks, such as tasks 220-280, are provided in step 430. These tasks have properties including, for example, a task name (e.g. 222*a*), a unique, hierarchical task number (e.g. 222*b*), a last start time (e.g. 222*c*), a last stop time (e.g. 222*d*), a scheduled execution time (e.g. 222*e*), a host id (e.g. 222*f*), a return code (e.g. "0" or "1"), a command, and a logical operand (e.g. 222*n*). The logical operand can be either AND or OR logic and this operand will output the return code to the corresponding successor tasks, although other functions may be used.

Once each of the tasks are defined, the user can enable, in step 440, the head task 210 and one or more child tasks, e.g. task 220, at the client system 110, to test one or more applications (e.g. a program server, and the like) that are present on a computer, such as the server 140. Each task can be executed on a different host, therefore the synchronization and the logical combination of return codes of processes (i.e. executed tasks) on different machines is possible by using the task graph. Once these tasks are enabled, they will begin to execute the application under test 170 when the scheduled time occurs. Once the scheduled time occurs, and the tasks have executed and completed any testing of the desired applications, the operation will end in step 450.

In a typical test scenario, the head task 210, containing a no operation (NOP) command, may provide an indication to the successor tasks that they should execute at a predetermined time. The successor tasks have synchronized executions times and may bring software source code from the server into the file system on the host where one or more additional tasks, such as compile, link, run, and any other "build" tasks associated with compiling and executing code, execute. These "build" tasks may be connected in parallel or serially and may compile and link the software source code on different operating systems, such as Windows NT, Linux, HP-Unix, etc. Moreover, the tasks may return "0" if successful and not "0" (e.g., "1") if there is an error.

The foregoing description is intended to illustrate but not to limit the scope of the invention, which is defined by the scope of the appended claims. Other embodiments are within the scope of the following claims.

What is claimed is:

1. A non-transitory computer-readable medium containing instructions to configure a processor to perform operations comprising:
   providing a parent task to initiate a task graph, the parent task including a task number unique to the task graph, wherein the task number defines a head position within a hierarchy forming the task graph, the task graph defining a test sequence of an application under test;
   providing one or more child tasks, the one or more child tasks each including
      a task number to define a position within the hierarchy forming the task graph,
      a command to be performed during execution of one of the child tasks,
      one or more times associated with an execution of one of the child tasks, and
      a logical operand for defining, based on a return value from a higher-layer task, whether the one of the child tasks is to proceed with execution,
   wherein a user interface at least one of modifies and defines the task number, the command, the one or more times, and the logical operand; and
   enabling the parent task to initiate execution of the task graph to begin the test sequence of the application under test,
   wherein providing the parent task further comprises providing a last start time for the parent task and a last stop time for the parent task.

2. The non-transitory computer-readable medium of claim 1, wherein providing the parent task further comprises: providing a task name for the parent task.

3. The non-transitory computer-readable medium of claim 1, wherein providing the parent task further comprises: providing an automatic execution time for the parent task.

4. The non-transitory computer-readable medium of claim 1, wherein providing the parent task further comprises: providing a host id for the parent task.

5. The non-transitory computer-readable medium of claim 1, wherein providing the parent task further comprises: providing a function and a logical operand for the parent task.

6. The non-transitory computer-readable medium of claim 1, wherein providing the parent task further comprises: providing links between the parent task and the one or more child tasks.

7. The non-transitory computer-readable medium of claim 1, further comprising:
   searching the one or more child tasks based on the task number of one of the child tasks.

8. A system comprising:
   at least one processor; and
   at least one memory, wherein the at least one processor and the at least one memory are configured to cause operations comprising:
   providing a parent task to initiate a task graph, the parent task including a task number unique to the task graph, wherein the task number defines a head position within a hierarchy forming the task graph, the task graph defining a test sequence of an application under test;
   providing one or more child tasks, the one or more child tasks each including
      a task number to define a position within the hierarchy forming the task graph,
      a command to be performed during execution of one of the child tasks,
      one or more times associated with an execution of one of the child tasks, and
      a logical operand for defining, based on a return value from a higher-layer task, whether the one of the child tasks is to proceed with execution; and
   enabling the parent task to initiate execution of the task graph to begin the test sequence of the application under test,
   wherein providing the parent task further comprises providing a last start time for the parent task and a last stop time for the parent task.

9. The system of claim 8, wherein providing the parent task further comprises: providing a task name for the parent task.

10. The system of claim 8, wherein providing the parent task further comprises: providing an automatic execution time for the parent task.

11. The system of claim 8, wherein providing the parent task further comprises: providing a function and a logical operand for the parent task.

12. The system of claim 8, wherein providing the parent task further comprises:
   searching the one or more child tasks based on the task number of one of the child tasks.

13. A method comprising:
   providing a parent task to initiate a task graph, the parent task including a task number unique to the task graph, wherein the task number defines a head position within a hierarchy forming the task graph, the task graph defining a test sequence of an application under test;
   providing one or more child tasks, the one or more child tasks each including
      a task number to define a position within the hierarchy forming the task graph,
      a command to be performed during execution of one of the child tasks,
      one or more times associated with an execution of one of the child tasks, and
      a logical operand for defining, based on a return value from a higher-layer task, whether the one of the child tasks is to proceed with execution,
   wherein a user interface at least one of modifies and defines the task number, the command, the one or more times, and the logical operand; and
   enabling the parent task to initiate execution of the task graph to begin the test sequence of the application under test,
   wherein providing the parent task further comprises providing a last start time for the parent task and a last stop time for the parent task.

14. The method of claim 13, wherein providing the parent task further comprises: providing a task name for the parent task.

15. The method of claim 13, wherein providing the parent task further comprises: providing an automatic execution time for the parent task.

16. The method of claim 13, wherein providing the parent task further comprises: providing a function and a logical operand for the parent task.

17. The method of claim 13, wherein providing the parent task further comprises:
   searching the one or more child tasks based on the task number of one of the child tasks.

* * * * *